No. 720,868. PATENTED FEB. 17, 1903.
J. WOOD & J. E. GIMSON.
ENGINE PACKING.
APPLICATION FILED APR. 26, 1902.
NO MODEL.
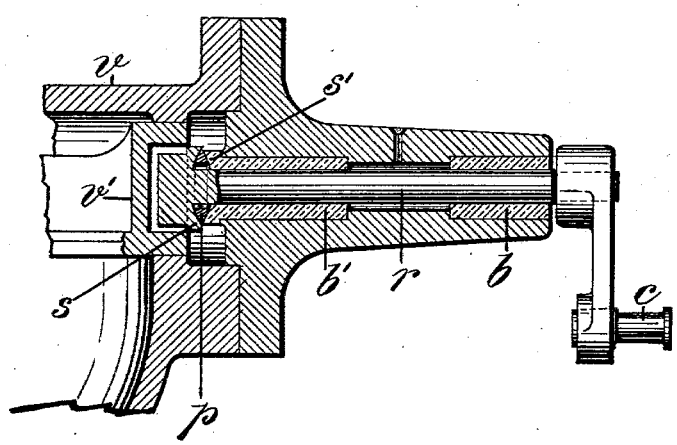
Witnesses:
Inventors
John Wood
John E. Gimson

UNITED STATES PATENT OFFICE.

JOHN WOOD, OF HADFIELD, AND JOHN EDWARD GIMSON, OF STALYBRIDGE, ENGLAND.

ENGINE-PACKING.

SPECIFICATION forming part of Letters Patent No. 720,868, dated February 17, 1903.

Application filed April 26, 1902. Serial No. 104,747. (No model.)

*To all whom it may concern:*

Be it known that we, JOHN WOOD, residing at Hadfield, in the county of Derby, and JOHN EDWARD GIMSON, residing at Stalybridge, in the county of Chester, England, subjects of the King of Great Britain, have invented new and useful Improvements in Engine-Packings, of which the following is a specification.

This invention relates to an improved engine-packing, which has been designed for use with rotary or rocking spindles, rods, shafts, journals, and the like.

The packing constructed to embody our present improvements consists of a loose ring or collar on the spindle or the like which is to be packed and having its opposite surfaces made spherically convex. The ring fits between two corresponding concave seatings, one of which is fixed upon or formed integrally with the rod or the like and the other fixed upon or with the bearing of the rod or the like. By this means free movement is permitted to a limited extent laterally in all directions without any risk of leakage of steam past the joint.

We will more particularly describe our said invention with reference to the accompanying drawing, which represents our improved packing as applied to the spindle of a Corliss valve in connection with a steam-engine.

In the drawing, which represents a longitudinal section, $c$ indicates the crank by means of which the valve is oscillated; $r$, the valve-spindle; $b$ $b'$, bushes forming bearings for the spindle; $v$, part of the steam-chest, and $v'$ part of the valve. With the exception of a portion of the rod and of one of the bearings, hereinafter referred to, all of these parts are of well-known construction.

The packing comprises the three essential parts $s$, $p$, and $s'$. Of these parts $s$ consists of a spherically-concave seating formed in an enlarged part of the spindle $r$, $s'$ of an opposed spherically-formed concave seating formed in the end of the bush or liner $b'$, and $p$ of a ring having a bore larger than the diameter of the rod $r$, which passes through it, and being formed with spherically-convex surfaces constructed to fit accurately in the seatings $s$ and $s'$.

It will be evident from the construction of the packing that all possible movements of the spindle $r$ are fully allowed for, that the joint will be perfectly steam-tight at all times, since the steam exerts a pressure on the joint in the direction of the seating $s'$, and that the loose ring $p$ is self-centering.

What we claim as our invention, and desire to secure by Letters Patent, is—

A rotary or rocking rod or shaft having an enlarged portion, a bushing or bearing in which the rod or shaft turns, said enlarged portion of the rod or shaft and said bushing having opposing spherically-concave seats and a loose ring surrounding the shaft and having spherically-convex surfaces engaging said concave surfaces respectively; substantially as described.

In testimony whereof we have signed our names to this specification in the presence of two subscribing witnesses.

JOHN WOOD.
JOHN EDWARD GIMSON.

Witnesses:
ARTHUR MILLWARD,
FRANK A. HEYS.